United States Patent [19]

Zhou

[11] Patent Number: 6,143,699
[45] Date of Patent: *Nov. 7, 2000

[54] PROCESS FOR REDUCING PERMEABILITY IN A SUBTERRANEAN FORMATION

[75] Inventor: Zhihong Zhou, Edmonton, Canada

[73] Assignee: Alberta Oil Sands Technology and Research Authority, Edmonton, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/760,573

[22] Filed: Dec. 4, 1996

[51] Int. Cl.$^7$ .............................. C09K 3/00; E21B 21/00
[52] U.S. Cl. ......................... 507/276; 507/200; 507/269; 507/277
[58] Field of Search .................................... 507/200, 269, 507/277, 276, 901

[56] References Cited

U.S. PATENT DOCUMENTS

| | | |
|---|---|---|
| 3,149,669 | 9/1964 | Binder, Jr. et al. .......................... 166/9 |
| 3,208,515 | 9/1965 | Meadors ........................................ 166/9 |
| 4,366,074 | 12/1982 | McLaughlin et al. ................. 252/8.55 |
| 4,561,985 | 12/1985 | Glass, Jr. ............................. 252/8.5 A |
| 4,625,802 | 12/1986 | Sydansk .................................. 166/292 |
| 4,631,091 | 12/1986 | Goodman ........................... 106/308 N |
| 4,799,551 | 1/1989 | Bauer et al. ............................. 166/303 |
| 5,099,923 | 3/1992 | Aften et al. ............................. 166/294 |
| 5,152,906 | 10/1992 | Aften et al. ........................... 252/8.551 |
| 5,203,411 | 4/1993 | Dawe et al. ............................. 166/274 |
| 5,576,271 | 11/1996 | Patel ........................................ 507/110 |
| 5,855,243 | 1/1999 | Bragg ..................................... 166/275 |

OTHER PUBLICATIONS

"Chemical Gel Systems for Improved Oil Recovery", H. Frampton (Allied Colloids Limited, Yorkshire, UK BD12 0JZ), Spec. Publ.—R. Soc. Chem., (Recent Advances in Oilfield Chemistry), 159:295–310)(1994).

*Primary Examiner*—Gabrielle Broullette
*Assistant Examiner*—Monique T. Cole
*Attorney, Agent, or Firm*—Kurt D. Van Tassel; Deborah G. Vandenhoff; Van Tassel & Associates

[57] ABSTRACT

A method is provided for blocking high permeability channels in subterranean geological formations, using swelling clay. A slurry is prepared by mixing swelling clay, such as bentonite, into an aqueous solution containing the salt of certain cations, which inhibit clay swelling. The cations $K^+$, $Ca^{2+}$ and $Mg^{2+}$, among others, are inhibitive of clay swelling. The clay slurry is introduced into a geological formation, where it preferentially enters channels of high permeability. There the slurry is contacted by NaCl brine solution present in natural or injected drive fluids, and the inhibitive cations bound to the clay particles are replaced by $Na^+$ ions, which attract water molecules and promote clay swelling. The $Na^+$-clay swells to up to 10 times its original volume, causing the slurry to acquire a gel-like consistency. The clay gel so formed is capable of blocking the flow of water, and can resist pressure of up to 500 kPa per meter.

22 Claims, 1 Drawing Sheet

FIG. 1.

PROCESS FOR REDUCING PERMEABILITY IN A SUBTERRANEAN FORMATION

FIELD OF THE INVENTION

The invention relates to a method for controlling the influx of water, which is caused by high permeability strata, fractures and wormholes, during the recovery of hydrocarbons from geological formations. In particular, the invention relates to chemical gel systems for permeability modification.

BACKGROUND OF THE INVENTION

During the recovery of hydrocarbons from geological formations, significant amounts of hydrocarbons are left behind because injected or natural drive fluids in the formation are produced along with the oil to such an extent that the cost of fluid disposal makes further oil recovery uneconomical. In formations with high permeability strata, fractures, or wormholes, natural drive fluids (such as brine or gaseous hydrocarbons) in primary recovery processes or flooding fluids (such as brine, steam or carbon dioxide) in secondary recovery processes flow through highly permeable zones, resulting in progressively less hydrocarbon being recovered per unit volume of fluid produced. This increased ratio of drive or flooding fluid to hydrocarbons is usually due either to early breakthrough of flooding fluid from injector wells to producer wells, or to excessive water encroachment into producer wells. It has adversely affected the economics of recovery processes in many parts of the world. For example, it was recently estimated that in the United States, 7 barrels of water are produced for each barrel of oil, amounting to $2.1 \times 10^{10}$ barrels of water annually. In Alberta, the ratio of water/oil produced is 5/1, amounting to $2.6 \times 10^9$ barrels of water produced in 1995.

The art of controlling or modifying fluid flows in the recovery of hydrocarbons from underground formations is commonly referred to as "conformance control". For the past two decades, research has been directed at improving the oil/water ratio during production by using chemical gel systems to block water flow through high permeability zones, fractures and wormholes (referred to herein as "channels"). The general approach has been to inject a mixture of reagents, initially low in viscosity, into regions of a formation which have high permeability channels. Once the mixture of reagents has reached its destination in the desired region of the formation, it then undergoes a chemical reaction to produce a gel which is capable of blocking the flow of water. Polymers, chemical gels, silica gels, and other blocking agents have been used in this way for conformance control in geological formations.

Ideally, a gel system for conformance control should have the following properties:

1. The reagents should be easily delivered to the desired location in the formation. The components therefore should be initially of low viscosity. No component should be adsorbed out prior to reaching its destination, and each component should be stable to shear stress encountered during delivery.
2. The chemical reaction(s) required for gelation should take place under the conditions found in the formation.
3. The gel generated should be of high strength and stable under the conditions found in the formation.
4. The degree of permeability reduction should be high.
5. The system should be of low enough cost to make it economically feasible.
6. The system should have minimal environmental impact.

All of the chemical gel systems currently available for conformance control have the drawback of being so costly that their use is limited. Examples of existing gel systems are:

1. Polyacrylamide copolymers which are injected together with a cross-linking agent, Chromium (III) or Aluminum (II);
2. Xanthan gum (a natural heteropolysaccharide) which is injected together with a cross-linking agent, Chromium (III);
3. Poly (Vinyl alcohol) which is injected together with a cross-linking agent, gluteraldehyde; and
4. Acidified sodium silicate, which when neutralized, rapidly undergoes polymerization to form spherical silica particles.

The most widely used method of these involves use of polyacrylamide cross-linked with chromium ions. Its use is limited by its cost: approximately $1000 is required to deliver 1 cubic meter of gel solution into a formation. It is also relatively unstable under the elevated temperature conditions which exist in geological formations during thermal recovery processes. Furthermore, Chromium (VI), the oxidation product of Chromium (III) is highly toxic, so the use of Chromium (III) as a cross-linking agent can be an environmental concern.

There is therefore a need to develop further conformance control gel systems which are environmentally safe, inexpensive and effective under the conditions encountered during hydrocarbon recovery.

SUMMARY OF THE INVENTION

In accordance with the present invention, a method is provided for plugging high permeability channels during hydrocarbon recovery from geological formations. The method involves using swelling clays as blocking agents. The invention depends on the ability of certain cations to prevent clay particles from swelling in aqueous solution, which allows a highly concentrated clay slurry to be prepared. Such a slurry is made by mixing swelling clays (such as smectites and vermiculites) into an aqueous solution containing a salt whose cations inhibit clay swelling (such as $K^+$, $Ca^{2+}$ or $Mg^{2+}$). The aqueous solution may also contain a dispersion agent to promote uniform suspension of clay particles in the slurry so it can easily be poured or injected into a formation. The clay slurry is injected into a geological formation where it preferentially penetrates high permeability channels. There the slurry is contacted by $Na^+$ ions which are dissolved in the natural formation water or in the drive fluid. A spontaneous cation exchange reaction occurs, in which the inhibitive cations bound to the clay particles are gradually replaced by $Na^+$ ions. Unlike the inhibitive cations, the $Na^+$ cation promotes clay swelling. The Na-clay becomes hydrated and increases in volume up to 10-fold. The process of swelling transforms the clay slurry into a clay gel which effectively plugs high permeability channels.

Broadly stated, the invention is a method for reducing the permeability of a high permeability channel in a subterranean geological formation containing Na$^+$ ions, comprising: mixing swelling clay, water and inhibitive cations which inhibit clay swelling, to form a slurry; and delivering the slurry into the channel so that it contacts Na$^+$ ions, whereby the clay swells in situ to reduce the permeability of the channel.

DETAILED DESCRIPTION OF THE PREFERRED EMBODIMENT

In accordance with the invention, a method for blocking water flow through high permeability channels in geological formations during hydrocarbon recovery is provided, comprising using swelling clay gels created in situ to plug high permeability channels.

It is known that swelling clays (smectites and vermiculites) become hydrated when exposed to fresh water and swell to many times the volume of the dried clay. However, they can not swell significantly when they are contacted with concentrated solutions of certain salts, whose cations bind to the clay particles and prevent hydration. Such cations, which include K$^+$, Ca$^{2+}$ and Mg$^{2+}$, are referred to herein as "inhibitive cations", and their salts as "inhibitive salts". Swelling clays can be dispersed in an aqueous solution containing an effective concentration of an inhibitive cation to form a highly concentrated slurry which is somewhat viscous. The slurry can be poured or injected into a permeable formation.

Sodium (Na$^+$), a cation which is present in the brine of many geological formations as well as in injection fluids, is not an inhibitive cation. Instead, it has the opposite effect of promoting hydration and clay swelling, presumably by binding to the negatively charged surfaces within clay particles and attracting further molecules of water. When concentrated clay slurries which have been prepared with inhibitive cations are contacted with Na$^+$-rich fluids, a spontaneous cation exchange reaction occurs. The Na$^+$ cations in solution exchange with the inhibitive cations bound to the clay particles in the slurry. For example, if the inhibitive cation is K$^+$, the K$^+$ ions are replaced by Na$^+$ ions when the slurry is contacted by NaCl brine in the following cation exchange reaction;

Na$^+$+K-Smectite→K$^+$+Na-Smectite.

The Na$^+$ ions bound to the clay particles attract water molecules. The clay then swells, causing the slurry to take on a gel-like consistency.

A highly concentrated clay slurry prepaped with inhibitive cations can be injected into a geological formation with high permeability channels. The cation exchange reaction which takes place when the slurry is contacted with Na$^+$-rich formation water and injection fluids initiates a gelation process. The clay gel so formed has the ability to block or reduce the permeability of the high permeability channels and to thereby significantly reduce the early breakthrough of flooding fluid from injector wells or excessive water production through producer wells.

The swelling clays used in the invention can be smectites (montmorillonite, saponite, nontronite, laponite, beidellite) and vermiculites. The amount of clay (its dry weight) in the slurry preferably can range from approximately 10–40 weight percent. If the clay content is too low, the swollen clay will not have a gel-like consistency. If the clay content is too high, the clay slurry will be too viscous to be poured or injected into a formation. Ideally the clay content should be 25–30 weight percent.

To form a clay slurry, the swelling clay is mixed into an aqueous solution containing the salt of an inhibitive cation. The inhibitive cations which are known to be effective in preventing the swelling of clays are K$^+$, NH$^+$, Cs$^+$, Ca$^{2+}$, Mg$^{2+}$, Fe$^{2+}$ and Al$^{3+}$. The most effective inhibitory cation is believed to be K$^+$. The identity of the anion in the inhibitive salt is not known to be of any importance. For example the K$^+$ cation could probably be provided in the form of KCl, KNO$_3$, K$_2$CO$_3$, or another salt containing K$^+$ as the cation. Normally, KCl is used as the source of K$^+$ ions. To be effective, the concentration of KCl present in the slurry preferably should be between 1–10 weight percent, and ideally between 3–5 weight percent. If the concentration of the inhibitive cation in the slurry is too low, the clay partially swells, reducing the amount of clay that can be mixed into a slurry, and thereby reducing the amount of swelling that can ultimately take place in situ.

As shown in Example 1 below, the strength of a clay gel is increased considerably (up to 90%) if the swelling clay is first pre-saturated with an inhibitive cation before making the slurry. This involves repeated washing of the clay in an inhibitive salt solution such as KCl solution. The clay is then dried before use. This step is thought to be effective because saturation of the clay particles with an inhibitive cation removes all the water-attracting Na$^+$ ions, leading to maximum swelling of the clay in situ.

Preferably, a dispersion agent is included in the slurry to prevent the clay particles from sticking together, thereby promoting a uniform suspension of clay particles in the slurry. Sodium acid pyrophosphate at concentrations ranging from 0.1–3.0 weight percent has been used as the dispersion agent. However, it is likely that other agents which can uniformly suspend clay particles in the slurry, such as sodium pyrophosphate or lignosulfonates, could also be used. The dispersion agents are thought to act by coating the clay particles with charged molecules which cause the particles to repel each other.

It is anticipated that the viscous clay slurries, when delivered into a geological formation, will preferentially enter channels of relatively high permeability, such as fractures or wormholes, and will not enter and effect blockage in areas of relatively low permeability in the formation. Results obtained with an experimental model (Example 2 below) showed that injected clay slurry preferentially enters and blocks simulated high permeability sand; it did not enter simulated low permeability sand.

The clay gels formed by the method of the invention have been shown experimentally to be capable of resisting a pressure drawdown in the range of 50–500 kPa/m.

The method of the invention has the further advantage of being inexpensive, because no costly materials are required. The 1996 cost for materials to make a cubic meter of clay gel are as follows:

bentonite—$33–$44, plus shipping costs of $20–$25;
KCl—$7–$9; and
additives—$3–$4.

The invention can be better understood by reference to the following non-limiting examples which demonstrate the preparation and testing of clay slurries for strength, and the use of clay slurries to block high permeability channels in a model system.

EXAMPLE 1

This example demonstrates: (1) the rheological properties of clay gels generated from slurries with increasing percentages of clay; and (2) the increased strength of gels generated with $K^+$ pre-saturated clay compared to untreated clay.

The swelling clay utilized in the experiments was a commercially available Wyoming bentonite (Smectite) (Hydrogel 125 from Wyo-Ben Inc., Billings, Montana). Clay slurries were prepared by adding varying amounts of bentonite into an aqueous solution containing 3 weight percent of dissolved KCl (a salt of the inhibitive cation $K^+$), and 0.1 weight percent of sodium acid pyrophosphate (a dispersion agent). The clay was gradually stirred into the solution. (The clay should not be stirred into water, because it will immediately swell and start to form a gel before the KCl can be added.)

The slurries were aged for at least four hours before testing.

The rheological properties (yield stress and plastic viscosity) were determined using aliquots of each slurry.

The slurries were then subjected to a gelation test as follows. Approximately 10 ml of each slurry was poured into a fritted glass tube (which is permeable to water) capped with a rubber stopper at one end. The other end of the tube was then capped with a rubber stopper, and the tube was immersed in a solution of 0.3M (1.73 weight percent) NaCl solution in order for the cation exchange process to take place and gelation to occur. After 48 hours, the glass tube was taken out of the NaCl solution, and the rubber stoppers removed. To test the strength of the gel, sufficient pressure (loading) was applied to one end of the clay gel to extrude it from the glass tube. From the measurement of the loading or extruding pressure, the shear stress between the clay gel and the glass wall of the tube was estimated using the equation: $T=rP/2L$, where T is the shear stress, r is the inside radius of the glass tube (0.65 cm), P is the extruding pressure, and L is the tube length (6.0) cm.

Clay slurries were prepared using either (A) 20, (B) 25, or (C) 30 weight percent of untreated bentonite, or (D) 30 weight percent of bentonite which had been previously saturated with $K^+$ ions and dried. The rheological properties of the clay slurries and clay gels which they formed after they were immersed in NaCl brine are shown in Table 1. Before gelation, all four of the slurries were of a thin enough consistency that they could be poured. Both the yield stress and plastic viscosity of the clay slurries increased with the clay concentration in the slurry. After gelation, when the rubber stoppers were removed, all four of the clay gels were thick enough to be retained in the tube. The extruding pressure required to remove the clay gels from the tubes increased with the clay content: 3.2 kPa for the 20% gel, 11 kPa for the 25% gel, and 40 kPa for the 30% gel. The corresponding shear stress between the glass wall and the clay gel for the 3 samples was 0.2 kPa, 0.6 kPa and 2.2 kPa. Thus the gel strength increased with the clay content of the gels over the range 20–30 weight percent. If placed in a fracture with an opening of 1.0 cm, the 30% clay gel could be expected to resist a pressure gradient of 435 kPa per meter. This estimate was made by using the shear stress of the 30% gel from the experimentally obtained value for (2.2 kPa), and using the equation $P/L=2T/\delta$ where P/L is the pressure gradient, T is the shear stress, and $\delta$ is the opening of the fracture.

TABLE 1

Rheological Properties of Clay Slurries and Clay Gels

| Sample | Clay Content (wt %) | Yield Stress (dyne/cm$^2$) | Plastic Viscosity (cp) | Extruding Pressure (kPa) | Sheer Stress (kPa) |
|---|---|---|---|---|---|
| A slurry | untreated (20%) | 59 | 11 | — | — |
| A gel | untreated (20%) | — | — | 3.2 | 0.2 |
| B slurry | untreated (25%) | 107 | 16 | | |
| B gel | untreated (25%) | — | — | 11 | 0.6 |
| C slurry | untreated (30%) | 397 | 52 | — | — |
| C gel | untreated (30%) | — | — | 40 | 2.2 |
| D slurry | $K^+$-saturated (30%) | 1,468 | 1,315 | — | — |
| D gel | $K^+$-saturated (30%) | — | — | 77 | 4.2 |

For sample D, pre-saturation of the clay with $K^+$ was carried out by washing it twice in a 1 M solution of KCl, following by a wash in $H_2O$ to remove excess KCl, and then drying it. The extruding pressure and shear stress for the $K^+$-pre-saturated 30% clay gel (77 kPa and 4.2 kPa respectively) was greater than for the untreated 30% clay gel. This indicates that a stronger clay gel can be generated if the clay is first saturated with an inhibitive cation, which has the effect of removing the $Na^+$ ions which were originally bound to the clay. EXAMPLE 2

A flow diversion test was utilized to demonstrate that a clay slurry, when delivered in situ, blocked flooding through a simulated high permeability channel.

Figure 1:
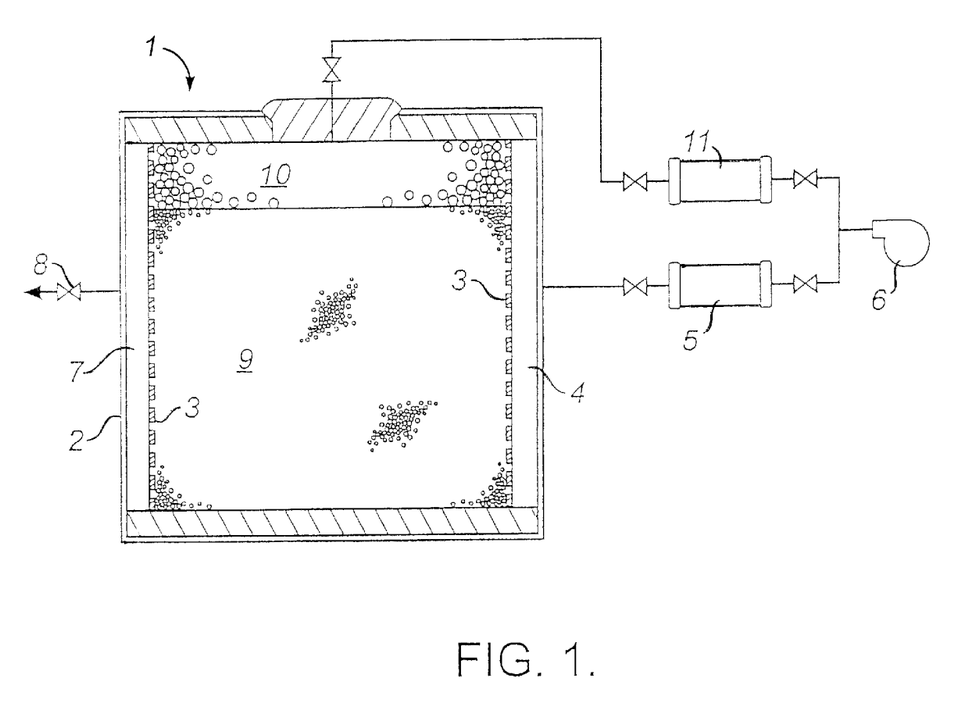
FIG. 1 is a schematic drawing of the laboratory apparatus used for carrying out the flow diversion experiments of Example 2.

The experimental apparatus, illustrated schematically in FIG. 1, consisted of a 2-dimensional plexiglass visualization chamber 1 of dimensions 19.8 cm ×17.3 cm ×2.2 cm housed in a steel frame 2. Perforations 3 were uniformly spaced along each side to allow the passage of fluid into and out of the visualization chamber. A fluid space 4 on one side of the visualization chamber received brine which was pumped from an injector cylinder 5 by means of a Ruska pump 6. The fluid space 7 on the other side of the visualization chamber was connected to a drain 8. The visualization chamber was packed with two layers of glass beads: the bottom layer 9 with fine glass beads (20 Darcy), to simulate a low permeability zone, and the top layer 10 with coarse glass beads (2000 Darcy) to simulate a high permeability channel, such as a fracture or a wormhole in a geological formation. The apparatus also provided for clay slurry to be pumped into the high permeability layer through an injector cylinder 11 by means of the Ruska pump 6.

The layers in the visualization chamber, shown in the photograph in FIG. 2A, were first equilibrated with a 0.3 M NaCl brine solution. This solution was designed to simulate the brine commonly found in a geological formation. Before the injection of clay slurry, a blue dye was added to the same brine solution, which was then pumped into the visualization chamber. The colored solution quickly spread through the high permeability layer at the top of the pack, but bypassed the low permeability layer below. In a second run a clay slurry, which had been prepared by mixing 30 weight percent Wyoming bentonite into a 3 weight percent KCl solution containing 0.1 weight percent of sodium acid pyrophosphate, was injected into the high permeability layer. The visualization chamber was then shut in to allow the cation exchange process to occur and a gel to form. After 3 days, the dye-colored NaCl brine solution was again injected into the visualization chamber. This time the bottom, low permeability layer became uniformly colored with blue dye, whereas the upper, high permeability layer remained completely uncolored.

This demonstrated that the clay gel had been effective in blocking the flow of brine through the upper, high permeability layer. It also demonstrated that the clay slurry stopped at the boundary between the high permeability channel and the low permeability zone, and did not invade the low permeability zone.

The scope of the invention is defined in the claims now following.

The embodiments of the invention in which an exclusive property or privilege is claimed are defined as follows:

1. A method for preventing water inflow to a well by reducing the permeability of a high permeability channel in a subterranean geological formation with formation water containing $Na^+$ ions, comprising:

mixing swelling clay, water and at least one inhibitive salt containing cation selected from the group consisting of $K^+$, $NH_4^+$, $Cs^+$, $Ca^{2+}$, $Mg^{2+}$, $Fe^{2+}$ and $Al^{3+}$ which inhibits clay swelling, to form a slurry containing 20 to 40 wt. % clay and between 3 and 5 wt. % inhibitive salt; and delivering the slurry into the channel so that it contacts the formation water containing $Na^+$ ions, whereby the clay will swell in situ and the yield stress of the clay slurry will increase at least three orders of magnitude to form a gel to reduce the permeability of the channel.

2. The method as set forth in claim 1 comprising;

providing a dispersion agent in the mixing step, for dispersing the clay.

3. The method as set forth in claim 1 comprising:

treating the swelling clay prior to mixing by saturating it with the inhibitive salt and drying the product.

4. The process as set forth claim 1 wherein the cation is $K^+$.

5. The method as set forth in claim 2 comprising:

treating the swelling clay prior to mixing by saturating it with the inhibitive salt and drying the product.

6. The method as set forth in claim 2 wherein the cation is $K^+$.

7. The method as set forth in claim 3 wherein the cation is $K^+$.

8. The method as set forth in claim 5 wherein the cation is $K^+$.

9. The method as set forth in claim 1 wherein:

the swelling clay content of the slurry is about 30 to 40 weight percent.

10. The method as set forth in claim 2 wherein:

the swelling clay content of the slurry is about 30 to 40 weight percent.

11. The method as set forth in claim 3 wherein:

the swelling clay content of the slurry is about 30 to 40 weight percent.

12. The method as set forth in claim 5 wherein:

the swelling clay content of the slurry is about 30 to 40 weight percent.

* * * * *

UNITED STATES PATENT AND TRADEMARK OFFICE
CERTIFICATE OF CORRECTION

PATENT NO. : 6,143,699  
DATED : November 7, 2000  
INVENTOR(S) : Zhihong Zhou Page 1 of 8

It is certified that error appears in the above-identified patent and that said Letters Patent is hereby corrected as shown below:

See Specification.

See claims.

Signed and Sealed this

Thirteenth Day of August, 2002

Attest:

Attesting Officer

JAMES E. ROGAN  
Director of the United States Patent and Trademark Office

United States Patent [19]
Zhou

[11] Patent Number: 6,143,699
[45] Date of Patent: *Nov. 7, 2000

[54] PROCESS FOR REDUCING PERMEABILITY IN A SUBTERRANEAN FORMATION

[75] Inventor: Zhihong Zhou, Edmonton (CA)

[73] Assignee: Alberta Oil Sands Technology and Research Authority, Edmonton (CA)

[ * ] Notice: This patent issued on a continued prosecution application filed under 37 CFR 1.53(d), and is subject to the twenty year patent term provisions of 35 U.S.C. 154(a)(2).

[21] Appl. No.: 08/760,573

[22] Filed: Dec. 4, 1996

[51] Int. Cl.$^7$ .............................. C09K 3/00; E21B 21/00
[52] U.S. Cl. ...................... 507/276; 507/200; 507/269; 507/277; 507/901
[58] Field of Search ................................ 507/200, 269, 507/277, 276, 901

[56] References Cited

U.S. PATENT DOCUMENTS

| | | | |
|---|---|---|---|
| 3,149,669 | 9/1964 | Binder, Jr. et al. | 166/9 |
| 3,208,515 | 9/1965 | Meadors | 166/9 |
| 4,366,074 | 12/1982 | McLaughlin et al. | 252/8.55 |
| 4,561,985 | 12/1985 | Glass, Jr. | 252/8.5 A |
| 4,625,802 | 12/1986 | Sydansk | 166/292 |
| 4,631,091 | 12/1986 | Goodman | 106/308 N |
| 4,799,551 | 1/1989 | Bauer et al. | 166/303 |
| 5,099,923 | 3/1992 | Aften et al. | 166/294 |
| 5,152,906 | 10/1992 | Aften et al. | 252/8.551 |
| 5,203,411 | 4/1993 | Dawe et al. | 166/274 |
| 5,576,271 | 11/1996 | Patel | 507/110 |
| 5,855,243 | 1/1999 | Bragg | 166/275 |

OTHER PUBLICATIONS

"Chemical Gel Systems for Improved Oil Recovery", H. Frampton (Allied Colloids Limited, Yorkshire, UK BD12 0JZ), Spec. Publ.—R. Soc. Chem., (Recent Advances in Oilfield Chemistry), 159:295–310)(1994).

*Primary Examiner*—Gabrielle Brouillette
*Assistant Examiner*—Monique T. Cole
*Attorney, Agent, or Firm*—Kurt D. Van Tassel;Deborah G. Vandenhoff; Van Tassel & Associates

[57] ABSTRACT

A method is provided for blocking high permeability channels in subterranean geological formations, using swelling clay. A slurry is prepared by mixing swelling clay, such as bentonite, into an aqueous solution containing the salt of certain cations, which inhibit clay swelling. The cations $K^+$, $Ca^{2+}$ and $Mg^{2+}$, among others, are inhibitive of clay swelling. The clay slurry is introduced into a geological formation, where it preferentially enters channels of high permeability. There the slurry is contacted by NaCl brine solution present in natural or injected drive fluids, and the inhibitive cations bound to the clay particles are replaced by $Na^+$ ions, which attract water molecules and promote clay swelling. The $Na^+$-clay swells to up to 10 times its original volume, causing the slurry to acquire a gel-like consistency. The clay gel so formed is capable of blocking the flow of water, and can resist pressure of up to 500 kPa per meter.

22 Claims, 1 Drawing Sheet

FIG. 1.

PROCESS FOR REDUCING PERMEABILITY IN A SUBTERRANEAN FORMATION

FIELD OF THE INVENTION

The invention relates to a method for controlling the influx of water, which is caused by high permeability strata, fractures and wormholes, during the recovery of hydrocarbons from geological formations. In particular, the invention relates to chemical gel systems for permeability modification.

BACKGROUND OF THE INVENTION

During the recovery of hydrocarbons from geological formations, significant amounts of hydrocarbons are left behind because injected or natural drive fluids in the formation are produced along with the oil to such an extent that the cost of fluid disposal makes further oil recovery uneconomical. In formations with high permeability strata, fractures, or wormholes, natural drive fluids (such as brine or gaseous hydrocarbons) in primary recovery processes or flooding fluids (such as brine, steam or carbon dioxide) in secondary recovery processes flow through highly permeable zones, resulting in progressively less hydrocarbon being recovered per unit volume of fluid produced. This increased ratio of drive or flooding fluid to hydrocarbons is usually due either to early breakthrough of flooding fluid from injector wells to producer wells, or to excessive water encroachment into producer wells. It has adversely affected the economics of recovery processes in many parts of the world. For example, it was recently estimated that in the United States, 7 barrels of water are produced for each barrel of oil, amounting to $2.1 \times 10^{10}$ barrels of water annually. In Alberta, the ratio of water/oil produced is 5/1, amounting to $2.6 \times 10^9$ barrels of water produced in 1995.

The art of controlling or modifying fluid flows in the recovery of hydrocarbons from underground formations is commonly referred to as "conformance control". For the past two decades, research has been directed at improving the oil/water ratio during production by using chemical gel systems to block water flow through high permeability zones, fractures and wormholes (referred to herein as "channels"). The general approach has been to inject a mixture of reagents, initially low in viscosity, into regions of a formation which have high permeability channels. Once the mixture of reagents has reached its destination in the desired region of the formation, it then undergoes a chemical reaction to produce a gel which is capable of blocking the flow of water. Polymers, chemical gels, silica gels, and other blocking agents have been used in this way for conformance control in geological formations.

Ideally, a gel system for conformance control should have the following properties:

1. The reagents should be easily delivered to the desired location in the formation. The components therefore should be initially of low viscosity. No component should be adsorbed out prior to reaching its destination, and each component should be stable to shear stress encountered during delivery.
2. The chemical reaction(s) required for gelation under the conditions found in the formation.
3. The gel generated should be of high strength the conditions found in the formation.
4. The degree of permeability reduction should be high.
5. The system should be of low enough cost to make it economically feasible.
6. The system should have minimal environmental impact.

All of the chemical gel systems currently available for conformance control have the drawback of being so costly that their use is limited. Examples of existing gel systems are:

1. Polyacrylamide copolymers which are injected together with a cross-linking agent, Chromium (III) or Aluminum (II);
2. Xanthan gum (a natural heteropolysaccharide) which together with a cross-linking agent, Chromium (III);
3. Poly (Vinyl alcohol) which is injected together with a cross-linking agent, gluteraldehyde; and
4. Acidified sodium silicate, which when neutralized, rapidly undergoes polymerization to form spherical silica particles.

The most widely used method of these involves use of polyacrylamide cross-linked with chromium ions. Its use is limited by its cost: approximately $1000 is required to deliver 1 cubic meter of gel solution into a formation. It is also relatively unstable under the elevated temperature conditions which exist in geological formations during thermal recovery processes. Furthermore, Chromium (VI), the oxidation product of Chromium (III) is highly toxic, so the use of Chromium (III) as a cross-linking agent can be an environmental concern.

There is therefore a need to develop further conformance control gel systems which are environmentally safe, inexpensive and effective under the conditions encountered during hydrocarbon recovery.

SUMMARY OF THE INVENTION

In accordance with the present invention, a method is provided for plugging high permeability channels during hydrocarbon recovery from geological formations. The method involves using swelling clays as blocking agents. The invention depends on the ability of certain cations to prevent clay particles from swelling in aqueous solution, which allows a highly concentrated clay slurry to be prepared. Such a slurry is made by mixing swelling clays (such as smectites and vermiculites) into an aqueous solution containing a salt whose cations inhibit clay swelling (such as $K^+$, $Ca^{2+}$ or $Mg^{2+}$). The aqueous solution may also contain a dispersion agent to promote uniform suspension of clay particles in the slurry so it can easily be poured or injected into a formation. The clay slurry is injected into a geological formation where it preferentially penetrates high permeability channels. There the slurry is contacted by $Na^+$ ions which are dissolved in the natural formation water or in the drive fluid. A spontaneous cation exchange reaction occurs, in which the inhibitive cations bound to the clay particles are gradually replaced by $Na^+$ ions. Unlike the inhibitive cations, the $Na^+$ cation promotes clay swelling. The Na-clay becomes hydrated and increases in volume up to 10-fold. The process of swelling transforms the clay slurry into a clay gel which effectively plugs high permeability channels.

Broadly stated, the invention is a method for reducing the permeability of a high permeability channel in a subterranean geological formation containing $Na^+$ ions, comprising: mixing swelling clay, water and inhibitive cations which inhibit clay swelling, to form a slurry; and delivering the slurry into the channel so that it contacts $Na^+$ ions, whereby the clay swells in situ to reduce the permeability of the channel.

DESCRIPTION OF THE DRAWINGS

FIG. 1 is a schematic drawing of the laboratory apparatus used for carrying out the flow diversion experiments of Example 2.

DETAILED DESCRIPTION OF THE PREFERRED EMBODIMENT

In accordance with the invention, a method for blocking water flow through high permeability channels in geological formations during hydrocarbon recovery is provided, comprising using swelling clay gels created in situ to plug high permeability channels.

It is known that swelling clays (smectites and vermiculites) become hydrated when exposed to fresh water and swell to many times the volume of the dried clay. However, they can not swell significantly when they are contacted with concentrated solutions of certain salts, whose cations bind to the clay particles and prevent hydration. Such cations, which include $K^+$, $Ca^{2+}$ and $Mg^{2+}$, are referred to herein as "inhibitive cations", and their salts as "inhibitive salts". Swelling clays can be dispersed in an aqueous solution containing an effective concentration of an inhibitive cation to form a highly concentrated slurry which is somewhat viscous. The slurry can be poured or injected into a permeable formation.

Sodium ($Na^+$), a cation which is present in the brine of many geological formations as well as in injection fluids, is not an inhibitive cation. Instead, it has the opposite effect of promoting hydration and clay swelling, presumably by binding to the negatively charged surfaces within clay particles and attracting further molecules of water. When concentrated clay slurries which have been prepared with inhibitive cations are contacted with $Na^+$-rich fluids, a spontaneous cation exchange reaction occurs. The $Na^+$ cations in solution exchange with the inhibitive cations bound to the clay particles in the slurry. For example, if the inhibitive cation is $K^+$, the $K^+$ ions are replaced by $Na^+$ ions when the slurry is contacted by NaCl brine in the following cation exchange reaction;

$$Na^+ + K\text{-Smectite} \rightarrow K^+ + Na\text{-Smectite}.$$

The $Na^+$ ions bound to the clay particles attract water molecules. The clay then swells, causing the slurry to take on a gel-like consistency.

A highly concentrated clay slurry prepared with inhibitive cations can be injected into a geological formation with high permeability channels. The cation exchange reaction which takes place when the slurry is contacted with $Na^+$-rich formation water and injection fluids initiates a gelation process. The clay gel so formed has the ability to block or reduce the permeability of the high permeability channels and to thereby significantly reduce the early breakthrough of flooding fluid from injector wells or excessive water production through producer wells.

The swelling clays used in the invention can be smectites, commonly known as bentonites, (montmorillonite, saponite, nontronite, laponite, beidellite) and vermiculites. The amount of clay (its dry weight) in the slurry preferably can range from approximately 10–40 weight percent. If the clay content is too low, the swollen clay will not have a gel-like consistency. If the clay content is too high, the clay slurry will be too viscous to be poured or injected into a formation. Ideally the clay content should be 25–30 weight percent.

To form a clay slurry, the swelling clay is mixed into an aqueous solution containing the salt of an inhibitive cation. The inhibitive cations which are known to be effective in preventing the swelling of clays are $K^+$, $NH_4^+$, $N(CH_3)_4^+$, $Cs^+$, $Ca^{2+}$, $Mg^{2+}$, $Fe^{2+}$ and $Al^{3+}$. The most effective inhibitory cation is believed to be $K^+$. The identity of the anion in the inhibitive salt is not known to be of any importance. For example the $K^+$ cation could probably be provided in the form of KCl, $KNO_3$, $K_2CO_3$, or another salt containing $K^+$ as the cation. Normally, KCl is used as the source of $K^+$ ions. To be effective, the concentration of KCl present in the slurry preferably should be between 1–10 weight percent, and ideally between 3–5 weight percent. If the concentration of the inhibitive cation in the slurry is too low, the clay partially swells, reducing the amount of clay that can be mixed into a slurry, and thereby reducing the amount of swelling that can ultimately take place in situ.

As shown in Example 1 below, the strength of a clay gel is increased considerably (up to 90%) if the swelling clay is first pre-saturated with an inhibitive cation before making the slurry. This involves repeated washing of the clay in an inhibitive salt solution such as KCl solution. The clay is then dried before use. This step is thought to be effective because saturation of the clay particles with an inhibitive cation removes all the water-attracting $Na^+$ ions, leading to maximum swelling of the clay in situ.

Preferably, a dispersion agent is included in the slurry to prevent the clay particles from sticking together, thereby promoting a uniform suspension of clay particles in the slurry. Sodium acid pyrophosphate at concentrations ranging from 0.1–3.0 weight percent has been used as the dispersion agent. However, it is likely that other agents which can uniformly suspend clay particles in the slurry, such as sodium pyrophosphate or lignosulfonates, could also be used. The dispersion agents are thought to act by coating the clay particles with charged molecules which cause the particles to repel each other.

It is anticipated that the viscous clay slurries, when delivered into a geological formation, will preferentially enter channels of relatively high permeability, such as fractures or wormholes, and will not enter and effect blockage in areas of relatively low permeability in the formation. Results obtained with an experimental model (Example 2 below) showed that injected clay slurry preferentially enters and blocks simulated high permeability sand; it did not enter simulated low permeability sand.

The clay gels formed by the method of the invention have been shown experimentally to be capable of resisting a pressure drawdown in the range of 50–500 kPa/m.

The method of the invention has the further advantage of being inexpensive, because no costly materials are required. The 1996 cost for materials to make a cubic meter of clay gel are as follows:

bentonite—$33–$44, plus shipping costs of $20–$25;

KCl—$7–$9; and additives—$3–$4.

The invention can be better understood by reference to the following non-limiting examples which demonstrate the preparation and testing of clay slurries for strength, and the use of clay slurries to block high permeability channels in a model system.

EXAMPLE 1

This example demonstrates: (1) the ability of a clay slurry to remain in the form of a clay slurry with increasing clay content; (2) the rheological properties of clay gels generated from slurries with increasing percentages of clay; and (3) the increased strength of gels generated with $K^+$ pre-saturated clay compared to the clay gels of (2).

The swelling clay utilized in the experiments was a commercially available Wyoming bentonite (Smectite) (Hydrogel 125 from Wyo-Ben Inc., Billings, Montana). Clay slurries were prepared by adding varying amounts of bentonite into an aqueous solution containing 3 weight percent of dissolved KCl (a salt of the inhibitive cation $K^+$), and 0.1 weight percent of sodium acid pyrophosphate (a dispersion agent). The clay was gradually stirred into the solution. (The clay should not be stirred into water, because it will immediately swell and start to form a gel before the KCl can be added.)

The slurries were aged for at least four hours before testing.

The rheological properties (yield stress and plastic viscosity) were determined using aliquots of each slurry.

The slurries were then subjected to a gelation test as follows. Approximately 10 ml of each slurry was poured into a fritted glass tube (which is permeable to water) capped with a rubber stopper at one end. The other end of the tube was then capped with a rubber stopper, and the tube was immersed in a solution of 0.3M (1.73 weight percent) NaCl solution in order for the cation exchange process to take place and gelation to occur. After 45 hours, the glass tube was taken out of the NaCl solution, and the rubber stoppers removed. To test the strength of the gel, sufficient pressure (loading) was applied to one end of the clay gel to extrude it from the glass tube. From the measurement of the loading or extruding pressure, the shear stress between the clay gel and the glass wall of the tube was estimated using the equation: $T=rP/2L$, where T is the shear stress, r is the inside radius of the glass tube (0.65 cm), P is the extruding pressure, and L is the tube length (6.0) cm.

increased with the clay content of the gels over the range 20–30 weight percent. If placed in a fracture with an opening of 1.0 cm, the 30% clay gel could be expected to resist a pressure gradient of 435 kPa per meter. This estimate was made by using the shear stress of the 30% gel from the experimentally obtained value for shear stress (2.2 kPa, 22,000 dyne/cm$^2$), and using the equation $P/L=2T/\delta$ where P/L is the pressure gradient, T is the shear stress, and $\delta$ is the opening of the fracture.

TABLE 1

RHEOLOGICAL PROPERTIES OF CLAY SLURRIES

| | | KCl | SLURRY | |
|---|---|---|---|---|
| Sample | Clay Content (wt. %) | Solution (wt. %) | Yield Stress (dyne/cm$^2$) | Plastic Viscosity (cp) |
| A | 20% | 3% | 59 | 11 |
| B | 25% | 3% | 107 | 16 |
| C | 30% | 3% | 397 | 52 |
| D | 30%, pre-saturated with $K^+$ | 3% | 1,468 | 1,315 |

TABLE 2

| | Precursor Clay/Water Composition | | | GEL | | | |
|---|---|---|---|---|---|---|---|
| | Clay Content | KCl Solution | Precursor Slurry | Extruding Pressure | | Shear Stress | |
| Sample | (wt. %) | (wt. %) | Flowable? (Yes/No) | (kPa) | (dyne/cm$^2$) | (kPa) | (dyne/cm$^2$) |
| A | 20% | 3% | Yes | 3.2 | 32,000 | 0.2 | 2,000 |
| B | 25% | 3% | Yes | 11 | 110,000 | 0.6 | 6,000 |
| C | 30% | 3% | Yes | 40 | 400,000 | 2.2 | 22,000 |
| D | 30%, pre-saturated with $K^+$ | 3% | Yes | 77 | 770,000 | 4.2 | 42,000 |

Clay slurries were prepared using either (A) 20, (B) 25, or (C) 30 weight percent of bentonite, or (D) 30 weight percent of bentonite which had been previously saturated with K+ ions and dried. For sample D, pre-saturation of the clay with $K^+$ was carried out by washing it twice in a 1M solution of KCl, following by a wash in $H_2O$ to remove excess KCl, and then drying it. The rheological properties of the clay slurries and clay gels which they formed after they were immersed in NaCl brine are shown in Tables 1 and 2. In each of Samples A–D, clay slurries were formed at clay contents ranging from 20–30% (wt.). Before gelation, all four of the clay slurries of Samples A, B, C and D were of a thin enough consistency that they could be poured. Both the yield stress and plastic viscosity of the Samples A–D clay slurries increased with the clay concentration in the slurry. After gelation, when the rubber stoppers were removed, all four of the clay gels of Samples A, B, C and D were thick enough to be retained in the tube. The extruding pressure required to remove the clay gels from the tubes increased with the clay content: 3.2 kPa (32,000 dyne/cm$^2$) for the 20% gel, 11 kPa (110,000 dyne/cm$^2$) for the 25% gel, and 40 kPa (400,000 dyne/cm$^2$) for the 30% gel. The corresponding shear stress between the glass wall and the clay gel for Samples A, B and C was 0.2 kPa (2,000 dyne/cm$^2$), 0.6 kPa (6,000 dyne/cm$^2$) and 2.2 kPa (22,000 dyne/cm$^2$). Thus the gel strength The extruding pressure and shear stress for the sample D gel (77 kPa (770,000 dyne/cm$^2$) and 4.2 kPa (42,000 dyne/cm$^2$), respectively) was greater than for the sample C gel (40 kPa (400,000 dyne/cm$^2$) and 2.2 kPa (22,000 dyne/cm$^2$), respectively). This indicates that a stronger clay gel can be generated if the clay is first saturated with an inhibitive cation, which has the effect of removing the $Na^+$ ions which were originally bound to the clay.

EXAMPLE 2

A flow diversion test was utilized to demonstrate that a clay slurry, when delivered in situ, blocked flooding through a simulated high permeability channel.

The experimental apparatus, illustrated schematically in FIG. 1, consisted of a 2-dimensional plexiglass visualization chamber 1 of dimensions 19.8 cm×17.3 cm×2.2 cm housed in a steel frame 2. Perforations 3 were uniformly spaced along each side to allow the passage of fluid into and out of the visualization chamber. A fluid space 4 on one side of the visualization chamber received brine which was pumped from an injector cylinder 5 by means of a Ruska pump 6. The fluid space 7 on the other side of the visualization chamber was connected to a drain 8. The visualization chamber was packed with two layers of glass beads: the bottom layer 9 with fine glass beads (20 Darcy), to simulate a low permeability zone, and the top layer 10 with coarse glass beads (2000 Darcy) to simulate a high permeability channel, such as a fracture or a wormhole in a geological formation. The apparatus also provided for clay slurry to be pumped into the high permeability layer through an injector cylinder 11 by means of the Ruska pump 6.

The layers in the visualization chamber were first equilibrated with a 0.3 M NaCl brine solution. This solution was designed to simulate the brine commonly found in a geological formation. Before the injection of clay slurry, a blue dye was added to the same brine solution, which was then pumped into the visualization chamber. The colored solution quickly spread through the high permeability layer at the top of the pack, but bypassed the low permeability layer below. In a second run a clay slurry, which had been prepared by mixing 30 weight percent Wyoming bentonite into a 3 weight percent KCl solution containing 0.1 weight percent of sodium acid pyrophosphate, was injected into the high permeability layer. The visualization chamber was then shut in to allow the cation exchange process to occur and a gel to form. After 3 days, the dye-colored NaCl brine solution was again injected into the visualization chamber. This time the bottom, low permeability layer became uniformly colored with blue dye, whereas the upper, high permeability layer remained completely uncolored.

This demonstrated that the clay gel had been effective in blocking the flow of brine through the upper, high permeability layer. It also demonstrated that the clay slurry stopped at the boundary between the high permeability channel and the low permeability zone, and did not invade the low permeability zone.

The scope of the invention is defined in the claims now following.

I Claim:

1. A method for controlling the flow of at least one fluid in a subterranean formation having at least a first region, said first region having (i) at least $Na^+$, and (ii) a first permeability, $K_1$, with respect to said fluid, said method comprising:
   (a) making an inhibitive electrolyte solution having water and at least one inhibitive compound, said inhibitive compound having at least one cation and anion;
   (b) making a clay slurry by mixing at least about 20 weight percent of clay with said inhibitive electrolyte solution so that, to the extent clay gel is produced, if any, the flowability of said clay slurry is not substantially inhibited;
   (c) injecting said clay slurry into said formation, so that at least a portion of said clay slurry contacts said first region having at least $Na^+$;
   (d) allowing a clay gel to form in said first region so that $K_1$ is reduced to produce a lower permeability, $K_{1L}$, with respect to said fluid; and
   (e) controlling the flow of at least a majority of said at least one fluid into or from said first region.

2. The method of claim 1 wherein said method is used in the production of hydrocarbons from said formation.

3. The method of claim 1 wherein said method is used to substantially contain said at least one fluid from said first region into a second region, said second region having at least a portion contiguous with said first region.

4. The method of claim 1 wherein the amount of clay in said clay slurry is in the range from about 20 weight percent to about 40 weight percent.

5. The method of claim 1 wherein the amount of clay in said clay slurry is in the range from about 20 weight percent to about 35 weight percent.

6. The method of claim 1 wherein the amount of clay in said clay slurry is in the range from about 25 weight percent to about 35 weight percent.

7. The method of claim 1 wherein the concentration of the inhibitive compound in said inhibitive electrolyte solution is in the range from about from about 3 weight percent to about 10 weight percent.

8. The method of claim 1 wherein said cation is selected from the group consisting of $Al^{3+}$, $Cs^+$, $Ca^{2+}$, $Fe^{2+}$, $K^+$, $NH_4^+$, $N(CH_3)_4^+$, $Mg^{2+}$ and combinations thereof.

9. The method of claim 1 wherein said formation further comprises a second region having a second permeability, $K_2$, with respect to said fluid that is less than $K_1$, said first and second regions being contiguous to each other, wherein,
   (a) when said clay gel is formed in step (d), said $K_{1L}$ is less than $K_2$ and,
   (b) the flow of at least a majority of said at least one fluid is controlled into or from said first region.

10. A method for controlling the flow of at least one fluid in a subterranean formation having at least a first region, said first region having (i) at least $Na^+$, and (ii) a first permeability, $K_1$, with respect to said fluid said method comprising:
    (a) making a first inhibitive electrolyte solution having water and at least one inhibitive compound, said inhibitive compound having at least one cation and anion;
    (b) treating a clay with said first inhibitive electrolyte solution;
    (c) making a clay slurry having at least about 20 weight percent of the treated clay of step (b) and a second inhibitive electrolyte solution having water and at least one inhibitive compound;
    (d) injecting said clay slurry into said formation, so that at least a portion of said clay slurry contacts said first region having at least $Na^+$;
    (e) allowing a clay gel to form in said first region so that $K_1$ is reduced to produce a lower permeability, $K_{1L}$, with respect to said fluid; and
    (f) controlling the flow of at least a majority of said at least one fluid into or from at least said first region.

11. The method of claim 10 wherein the treated clay of step (b) has a reduced ability to form a clay gel, if any, when said treated clay is mixed with distilled water.

12. The method of claim 10 wherein the treated clay of step (b) is treated by washing said clay at least once with said first inhibitive electrolyte solution and drying said washed clay.

13. The method of claim 12 further comprising washing said clay with at least water at least once after said clay is washed at least once with said first inhibitive electrolyte solution but before said clay is dried.

14. The method of claim 12 wherein the concentration of the inhibitive compound in said first inhibitive electrolyte solution is in the range from about 1 weight percent to about 20 weight percent.

15. The method of claim 10 wherein the concentration of the inhibitive compound in said second inhibitive electrolyte solution is in the range from about 1 weight percent to about 10 weight percent.

16. The method of claim 10 wherein the control of said fluid is used in the production of hydrocarbons from said formation.

17. The method of claim 10 wherein the control of said fluid is used to inhibit a rate of flow of at least said fluid from said first region into a second region, said second region having at least a portion contiguous with said first region.

18. The method of claim 10 wherein the amount of clay in said clay slurry is in the range from about 20 weight percent to about 40 weight percent.

19. The method of claim 10 wherein the amount of clay in said clay slurry is in the range from about 20 weight percent to about 35 weight percent.

20. The method of claim 10 wherein the amount of clay in said clay slurry is in the range from about 25 weight percent to about 35 weight percent.

21. The method of claim 10 wherein said cation is selected from the group consisting of $Al^{3+}$, $Cs^+$, $Ca^{2+}$, $Fe^{2+}$, $K^+$, $NH_4^+$, $N(CH_3)_4^+$, $Mg^{2+}$ and combinations thereof.

22. The method of claim 10 wherein said formation further comprises a second region having a second permeability, $K_2$, with respect to said fluid that is less than $K_1$, said first and second regions being contiguous to each other, wherein
  (a) when said clay gel is formed in step (e), said $K_{1L}$ is less than $K_2$ and,
  (b) the flow of at least a majority of the said at least one fluid is controlled into or from at least said first region.

* * * * *